(12) United States Patent
Nagai et al.

(10) Patent No.: US 7,042,187 B2
(45) Date of Patent: May 9, 2006

(54) CONTROL APPARATUS FOR ELECTRIC ACTUATOR

(75) Inventors: Shigekazu Nagai, Adachi-ku (JP); Takeshi Hirose, Moriya (JP)

(73) Assignee: SMC Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/945,907

(22) Filed: Sep. 22, 2004

(65) Prior Publication Data

US 2005/0116674 A1 Jun. 2, 2005

(30) Foreign Application Priority Data

Nov. 28, 2003 (JP) .............................. 2003-398620

(51) Int. Cl.
  *B65H 59/38* (2006.01)
  *G05B 19/404* (2006.01)

(52) U.S. Cl. ...................... 318/609; 318/610; 318/630; 318/631

(58) Field of Classification Search ................ 318/280, 318/434, 432, 471, 470, 563, 626, 630, 632, 318/601, 609, 610
See application file for complete search history.

(56) References Cited

U.S. PATENT DOCUMENTS

| | | | | |
|---|---|---|---|---|
| 3,989,992 A | * | 11/1976 | Schmidt | 318/257 |
| 4,300,079 A | * | 11/1981 | Kawada et al. | 388/343 |
| 4,395,904 A | * | 8/1983 | Ivanov et al. | 73/118.1 |
| 4,467,250 A | * | 8/1984 | Thomasson | 318/436 |
| 4,494,051 A | * | 1/1985 | Bailey | 318/254 |
| 4,731,996 A | * | 3/1988 | Smith et al. | 60/390 |
| 5,363,027 A | * | 11/1994 | Noguchi | 318/573 |
| 5,382,890 A | * | 1/1995 | Moh et al. | 318/254 |
| 5,852,996 A | * | 12/1998 | Nakamura et al. | 123/399 |
| 6,166,502 A | * | 12/2000 | Pattok et al. | 318/434 |
| 6,291,955 B1 | * | 9/2001 | Itabashi et al. | 318/434 |
| 6,333,617 B1 | * | 12/2001 | Itabashi et al. | 318/801 |
| 6,363,214 B1 | * | 3/2002 | Merello et al. | 318/109 |
| 6,593,716 B1 | * | 7/2003 | Lange et al. | 318/471 |
| 2003/0122517 A1 | * | 7/2003 | Lange et al. | 318/471 |
| 2003/0205977 A1 | * | 11/2003 | Itabashi et al. | 318/434 |
| 2004/0130281 A1 | * | 7/2004 | Jensen | 318/280 |

FOREIGN PATENT DOCUMENTS

JP    2002-066969    3/2002

OTHER PUBLICATIONS

Copending U.S. Appl. No. 11/273,343 filed on Nov. 15, 2005, by Shigekazu Nagai et al.

* cited by examiner

*Primary Examiner*—Paul Ip
(74) *Attorney, Agent, or Firm*—Paul A. Guss

(57) ABSTRACT

A driver for an electric actuator comprises a direction-switching means which switches a direction of rotation of a rotary driving source based on a direction instruction input signal, a current amplifier/limiter which converts a voltage outputted from the direction-switching means into a corresponding current and which limits the current with reference to a preset reference current $I_{MAX}$ or a threshold value, a current sensor which detects the current supplied to the rotary driving source, and a current loop by which a detection signal from the current sensor is fed back to an upstream side of the current amplifier/limiter.

7 Claims, 7 Drawing Sheets

CONTROL APPARATUS FOR ELECTRIC ACTUATOR

BACKGROUND OF THE INVENTION

1. Field of the Invention

The present invention relates to a control apparatus for an electric actuator, which makes it possible to preferably protect a rotary driving source for driving the electric actuator.

2. Description of the Related Art

In general, when an industrial robot of the installation type is used, a base is fixed by using, for example, bolts. The operation of the robot is stopped by detecting excess current when any forcible pushing or collision occurs at the end of the robot due to any mistake in relation to interlock or the like. That is, it is principally intended that the robot and/or a workpiece is prevented from breakage or destruction by detecting the excess current for the industrial robot of the installation type. In this case, the positional deviation of the robot is not taken into account.

In view of the above, Japanese Laid-Open Patent Publication No. 2002-66969 discloses prevention of an automatic or unmanned transport vehicle from being lifted up or raised upwardly even when the end of a robot arm causes any forcible pushing or collision against the equipment.

That is, Japanese Laid-Open Patent Publication No. 2002-66969 discloses that the end of the robot arm is moved in response to the control of the posture and the position in relation to the end of the robot arm, and that a control apparatus executes the restriction of the current supplied to a servo motor for driving a joint of the robot arm when the joint torque applied to the joint of the robot arm reaches a predetermined limiting value.

However, when the technical concept disclosed in Japanese Laid-Open Patent Publication No. 2002-66969 is applied, for example, to an electric actuator for converting the rotary motion of a motor into the rectilinear motion of a slider or the like, it is necessary to provide a control circuit and a detector such as a resolver and an encoder in order to control the operation speed and the position of the slider. As a result, production cost may be high.

SUMMARY OF THE INVENTION

A general object of the present invention is to provide a control apparatus for an electric actuator, which makes it possible to restrict the current applied to a rotary driving source by using a simple circuit even when any high load is exerted on the rotary driving source for driving the electric actuator.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
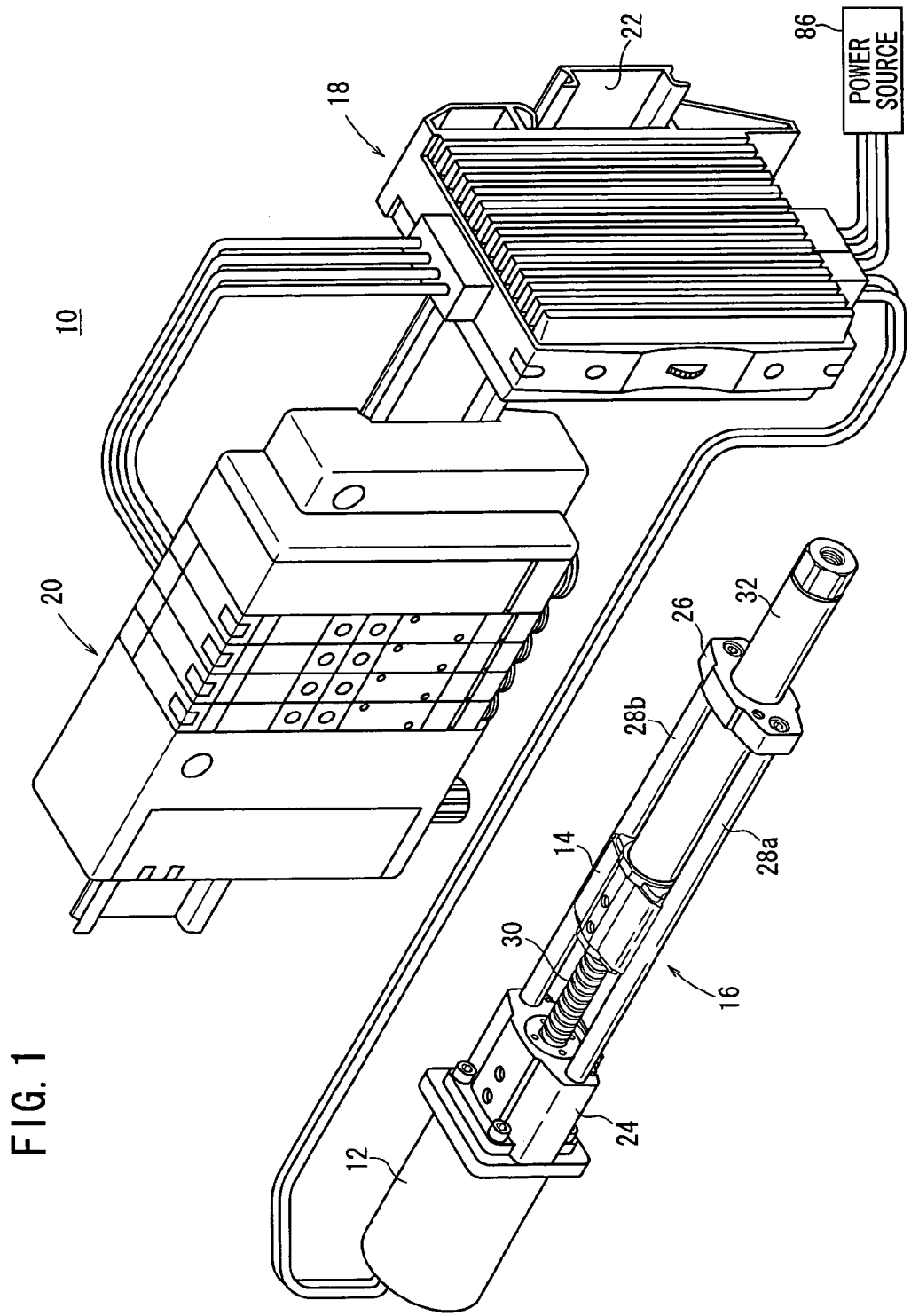
FIG. 1 is a perspective view illustrating a control system into which a driver for an electric-actuator according to an embodiment of the present invention is incorporated.

With reference to FIG. 1, reference numeral 10 indicates a control system into which a driver for an electric actuator according to an embodiment of the present invention (hereinafter referred to as "driver") is incorporated.

The control system 10 comprises an electric actuator 16 in which a slider 14 makes reciprocating motion linearly when driven by a rotary driving source 12, a driver 18 which energizes/deenergizes the rotary driving source 12 equipped to the electric actuator 16, and a controller 20 which sends a direction instruction input signal to the driver 18.

The controller 20 and the driver 18 are provided in a joinable manner by the aid of a rail member 22 which makes engagement with recesses formed on the back surfaces of respective casings.

The rotary driving source 12 is favorably constructed, for example, by a servo motor such as a brush-equipped DC motor, a brushless DC motor, and a stepping motor. A linear motor such as a solenoid may be used as the rotary driving source 12.

The electric actuator 16 includes an actuator body 24; the rotary driving source 12 which is connected to one end of the actuator body 24 by screw members; a pair of guide shafts 28a, 28b which extend in parallel between the actuator body 24 and an end block 26; and a ball screw shaft 30 which is connected to the drive shaft of the rotary driving source 12 by an unillustrated coupling member.

The electric actuator 16 further includes the slider 14 which has an unillustrated ball screw nut for making screw engagement with the ball screw shaft 30 and which makes the reciprocating motion linearly while guided by the pair of guide shafts 28a, 28b; and a rod 32 which is connected to the slider 14. The rod 32 makes forward and backward movement integrally with the slider 14, and a part of the rod 32 protrudes from the end block 26. The slider 14 and the rod 32 function as a movable member.

Figure 2:
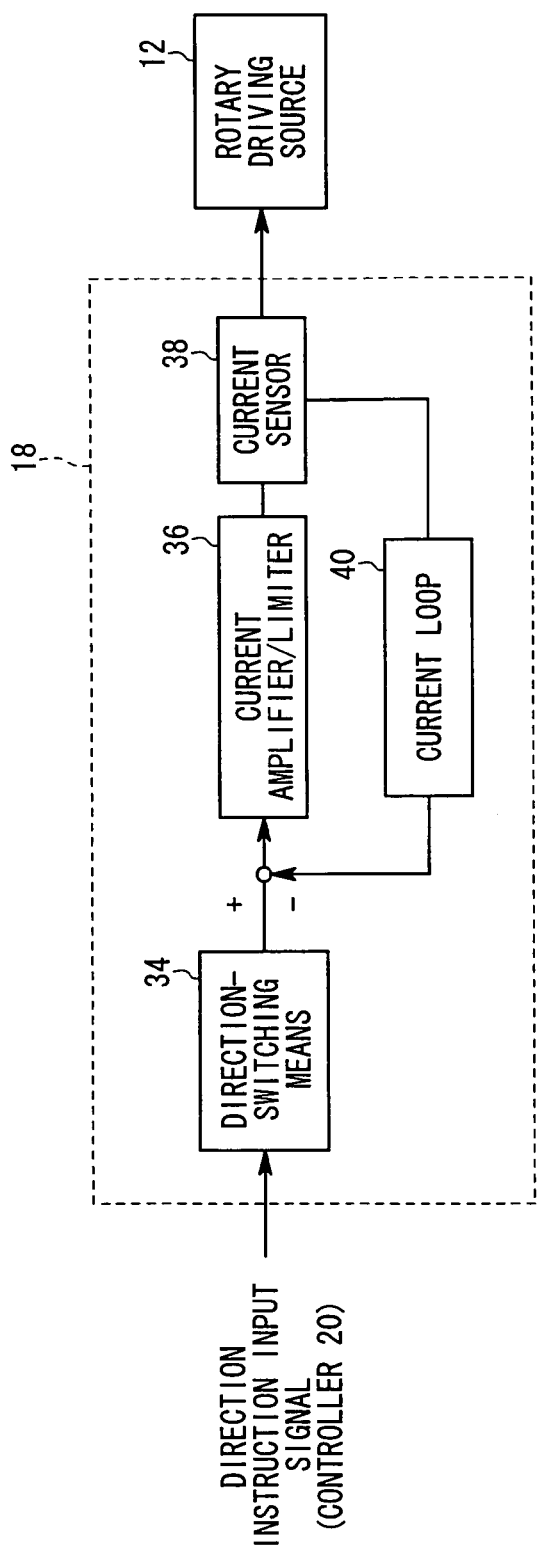
FIG. 2 is a schematic block diagram illustrating an arrangement of the driver for the electric actuator shown in FIG. 1.

Next, FIG. 2 shows a schematic block diagram illustrating an arrangement of the driver 18.

The driver 18 includes a direction-switching means 34 which switches the direction of rotation of the rotary driving source 12 to any one of the positive and negative directions by switching the polarity of the voltage in accordance with the direction instruction input signal sent from the controller 20; and a current amplifier/limiter 36 which converts the voltage outputted from the direction-switching means 34 into a corresponding current and which limits the current with reference to a preset reference current $I_{MAX}$ (threshold value).

The driver 18 further includes a current sensor (current-detecting means) 38 which is provided on the downstream side of the current amplifier/limiter 36 and which detects the current supplied to the rotary driving source 12; and a current loop 40 for feedback of the detection signal from the current sensor 38 to the upstream side of the current amplifier/limiter 36.

Figure 3:
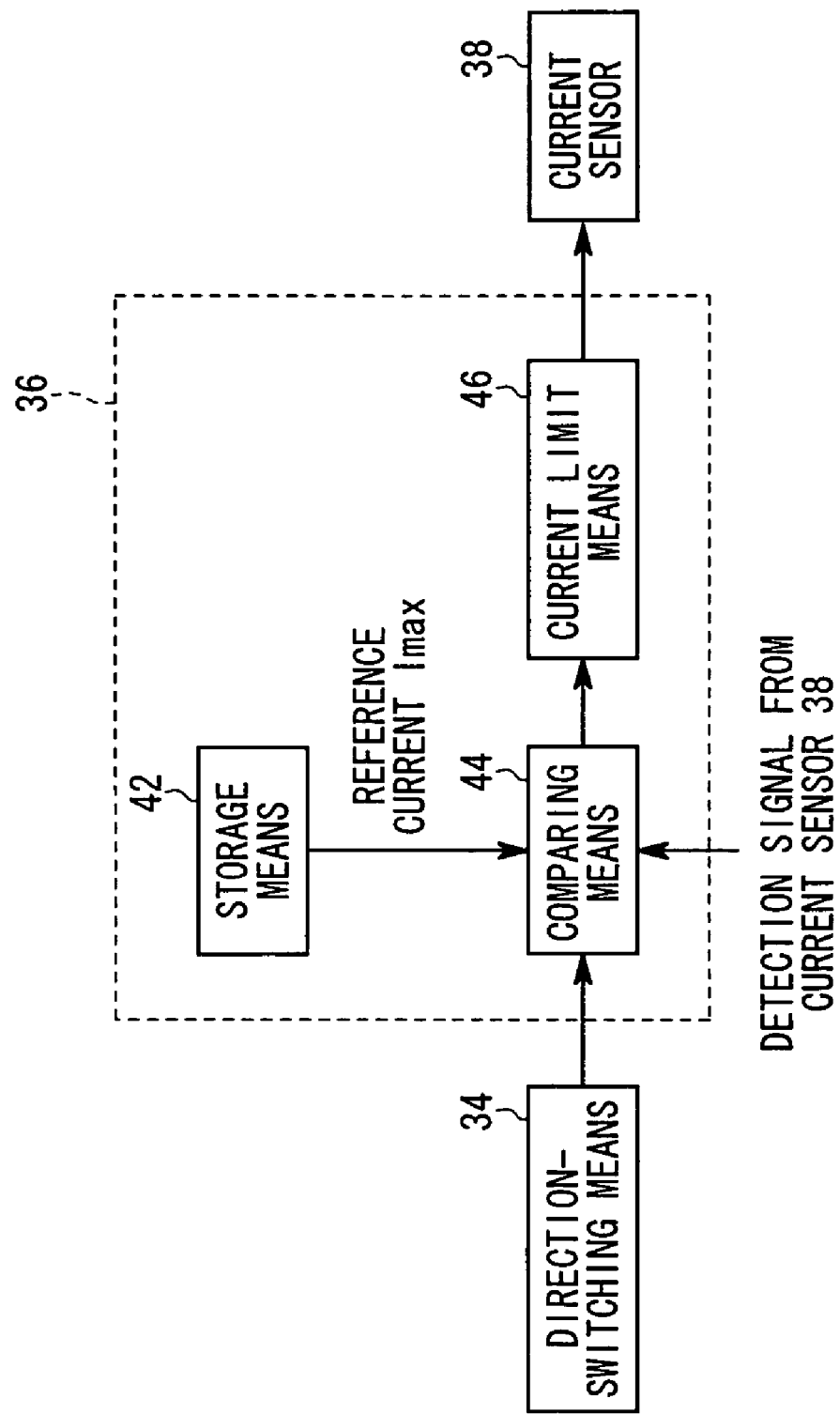
FIG. 3 is a block diagram illustrating an arrangement of a current amplifier/limiter shown in FIG. 2.

As shown in FIG. 3, the current amplifier/limiter 36 includes a comparing means 44 which compares the preset reference current $I_{MAX}$ stored in a storage means 42 with the detection signal from the current sensor 38; and a current limit means 46 which limits the current supplied to the rotary driving source 12 so that the current does not exceed the reference current $I_{MAX}$, for example, when any high load is applied to the rotary driving source 12 and the current supplied to the rotary driving source 12 may exceed the reference current $I_{MAX}$.

The driver 18 has an unillustrated circuit board. For example, the current sensor 38 is favorably constructed by a resistor with a low resistance value arranged on the circuit board.

The control system 10, into which the driver 18 according to the embodiment of the present invention is incorporated, is basically constructed as described above. Next, its operation, function, and effect will be explained.

First, a direction instruction input signal from the controller 20 is sent to the driver 18. In the driver 18, the polarity of the voltage is switched based on the direction instruction input signal, and thus the direction of rotation of the rotary driving source 12 is switched to any one of the positive and negative directions. The voltage, which corresponds to the current supplied from the direction-switching means 34 to the rotary driving source 12, is inputted into the current amplifier/limiter 36.

The current amplifier/limiter 36 converts the voltage outputted from the direction-switching means 34 into corresponding current, and the current is supplied to the rotary driving source 12. Accordingly, the rotary driving source 12 is driven and rotated in a predetermined direction.

The rotary motion of the rotary driving source 12 is transmitted to the ball screw shaft 30 connected to the drive shaft of the rotary driving source 12. The rotary motion is converted into the rectilinear motion by the engagement between the ball screw shaft 30 and the unillustrated ball screw nut. The rectilinear motion is transmitted to the slider 14. Therefore, the rod 32 extends outside integrally with the slider 14. Accordingly, the pushing or pressing operation is performed to push or press an unillustrated workpiece to a predetermined position.

After the slider 14 arrives at a predetermined stroke end, when the workpiece is further pushed at the predetermined position by the rod 32, and any high load is applied to the rotary driving source 12, a locked state is given, in which the rotation of the drive shaft of the rotary driving source 12 is stopped while energized. In this situation, the torque outputted from the drive shaft of the rotary driving source 12 is proportional to the current applied to the rotary driving source 12. Therefore, when the locked state is given, any current (excess current), which is not less than a preset current value, may be applied to the rotary driving source 12, and the rotary driving source 12 may be burnt out due to the excess current.

Figure 4:
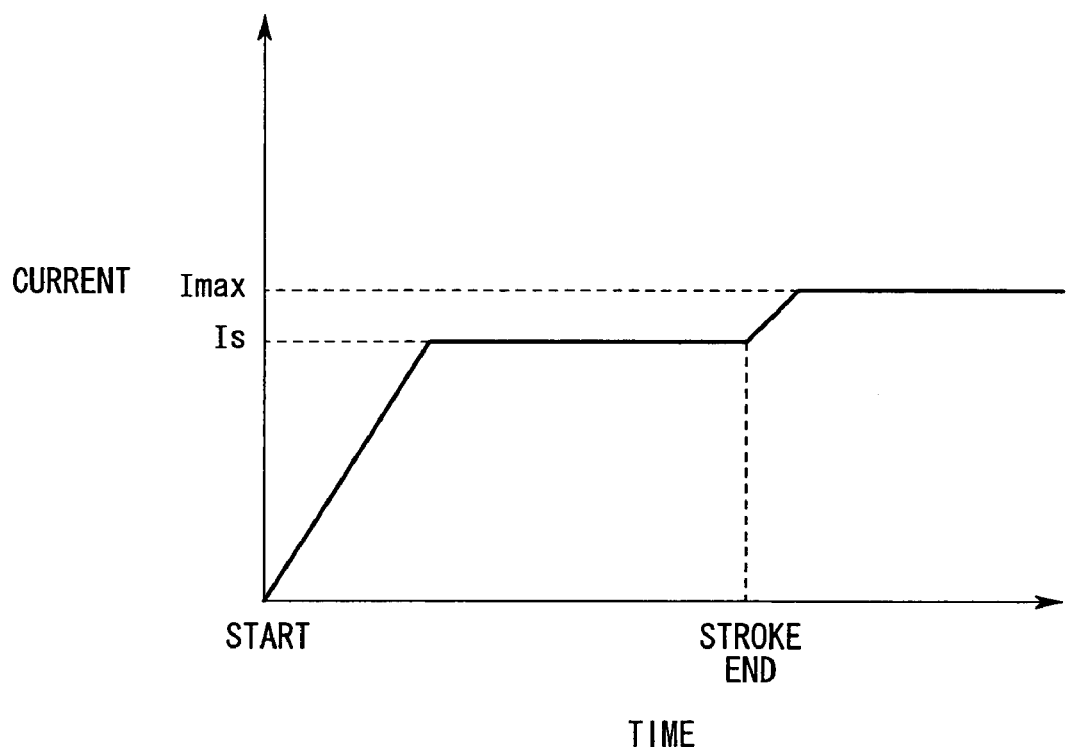
FIG. 4 shows a characteristic curve illustrating the relationship between the time of displacement of a slider of the electric actuator and the current to be supplied to a rotary driving source.

Accordingly, in the embodiment of the present invention, the detection signal, which is supplied from the current sensor 38 for detecting the current supplied to the rotary driving source 12, is fed back to the upstream side of the current amplifier/limiter 36 via the current loop 40. The current amplifier/limiter 36 compares the preset reference current $I_{MAX}$ stored in the storage means 42 with the detection signal from the current sensor 38 by the comparing means 44. Further, the current supplied to the rotary driving source 12 is limited by the current limit means 46 so that the current does not exceed the reference current $I_{MAX}$ (see FIGS. 4 and 3).

As described above, in the embodiment of the present invention, the value of the current supplied to the rotary driving source 12 is monitored by using the current sensor 38, and the current applied to the rotary driving source 12 is limited to be not more than the reference current $I_{MAX}$ by using the current amplifier/limiter 36. As a result, even when any high load is applied to the rotary driving source 12, and the drive shaft of the rotary driving source 12 in an ON state is stopped and locked, the current supplied to the rotary driving source 12 is limited to be not more than the preset reference current $I_{MAX}$. Therefore, it is possible to avoid any burnout of the rotary driving source 12, which would be otherwise caused by excess current. It is a matter of course that the torque can be limited by limiting the current supplied to the rotary driving source 12.

In the embodiment of the present invention, it is not necessary to provide any control circuit and any detector such as a resolver and an encoder in order to control the operation speed and the position of the slider 14. The burnout of the rotary driving source 12 is avoided by a simple circuit. Accordingly, it is possible to reduce production cost.

In this case, it is preferable that the driver 18 according to the embodiment of the present invention is applied to a driving device (electric actuator) in which only the pushing operation effected by the rod 32 and the direction of rotation of the rotary driving source 12 are controlled.

The embodiment of the present invention has been explained based on the pushing operation for the workpiece performed by the rod 32 of the electric actuator 16. However, the present invention is not limited thereto. It is a matter of course that the present invention is applicable, for example, to the workpiece transport operation, the caulking operation, the pressing operation, the supporting operation performed by the rod 32 of the electric actuator 16, and the workpiece-gripping operation performed by an unillustrated electric chuck as well as the clamping operation performed by an unillustrated electric clamp.

That is, when undesirable high load is applied to the rotary driving source 12 by some operations such as the workpiece transport operation, the workpiece-gripping operation, or the clamping operation as described above, and the rotation of the drive shaft of the rotary driving source 12 is stopped and locked, the current supplied to the rotary driving source 12 is limited to be not more than the reference current $I_{MAX}$.

Next, an explanation will be made about a first comparative embodiment and a second comparative embodiment which are compared with the embodiment of the present invention. The constituent elements that are the same as those of the above embodiment are designated by the same reference numerals, and any detailed explanation thereof will be omitted.

Figure 5:
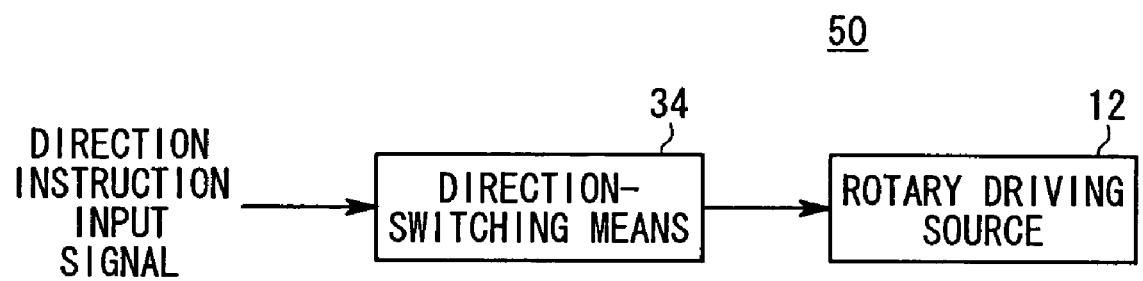
FIG. 5 is a block diagram illustrating an arrangement of a relay circuit concerning a first comparative embodiment.

FIG. 5 shows a relay circuit 50 concerning the first comparative embodiment. In this case, when a plurality of the relay circuits 50 are used in combination, it is possible to switch the direction of rotation of the rotary driving source 12. However, when the drive shaft of the rotary driving source 12 is stopped and locked, current that is not less than the current allowed by the rotary driving source 12 may be supplied with the relay circuit 50, and burnout may appear.

Figure 6:
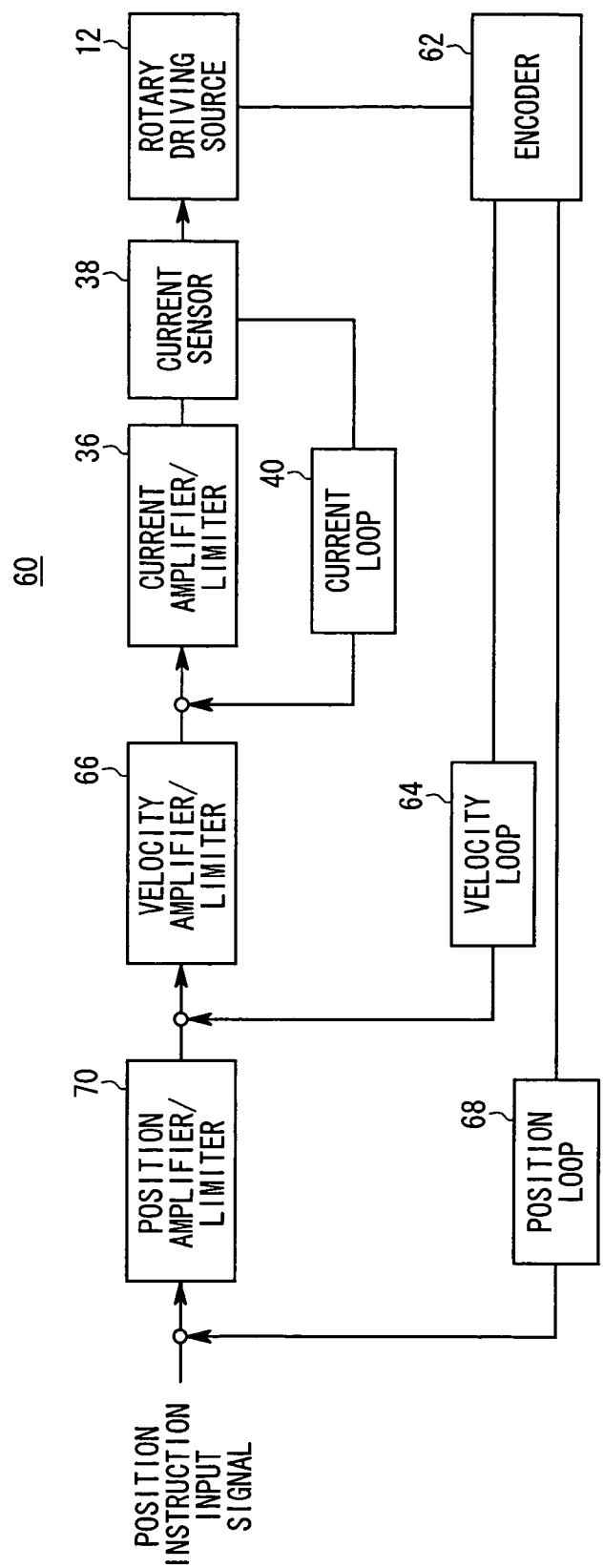
FIG. 6 is a block diagram illustrating an arrangement of a servo circuit concerning a second comparative embodiment.

FIG. 6 shows a servo circuit 60 concerning the second comparative embodiment. The servo circuit 60 has a detector such as an encoder 62 and a resolver, and comprises a control circuit which makes feedback control for velocity by a velocity loop 64 and a velocity amplifier/limiter 66; and another control circuit which makes the feedback control for position by a position loop 68 and a position amplifier/limiter 70. Therefore, in the servo circuit 60 concerning the second comparative embodiment, it is necessary to provide the highly accurate control circuits for controlling the position and the velocity. Therefore, the servo circuit 60 is expensive, and production cost is increased.

In contrast, in the embodiment of the present invention, it is possible to achieve moderate function and cost performance compared with those of the relay circuit 50 concerning the first comparative embodiment and the servo circuit 60 concerning the second comparative embodiment. Using the embodiment of the present invention, when the electric actuator 16 is operated in accordance with the ON/OFF control in the same manner as in the solenoid-operated valve, it is possible to use the present control device as a direction control device which is suitable, for example, for the pushing operation and the transport operation. In the embodiment of the present invention, it is unnecessary to provide any detector such as an encoder externally added to the rotary driving source 12. Therefore, it is possible to reduce the size and weight of a device.

Figure 7:
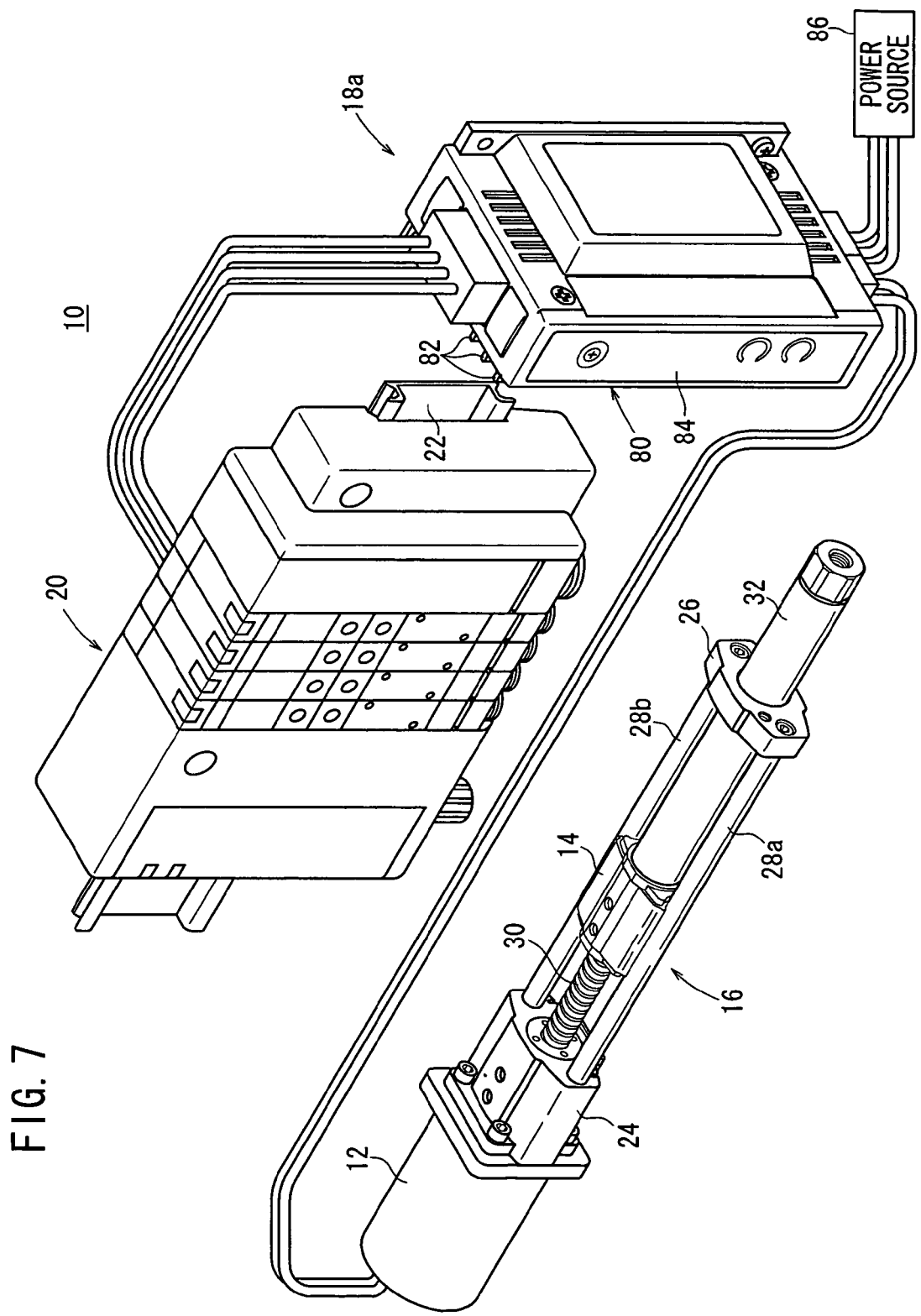
FIG. 7 is a perspective view illustrating a control system into which a driver for an electric actuator according to another embodiment of the present invention is incorporated.

Next, FIG. 7 shows a control system into which a driver for an electric actuator according to another embodiment of the present invention is incorporated.

The driver 18a for the electric actuator according to the another embodiment is identical to the driver 18 in that the driver 18a has the internal structure as shown in the block diagram illustrating the arrangement in FIG. 2. However, the driver 18a differs from the driver 18 in that radiating fins 82, which are a plurality of substantially parallel-striped ridges extending in the vertical direction, are provided on an outer surface of a casing 80.

An operation portion 84 is provided on another side surface of the casing 80. A first connector portion, which is connected to the controller 20, is provided on the upper surface of the casing 80. A second connector portion, which is connected to a power source 86 and the rotary driving source 12, is provided on the lower surface of the casing 80.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A control apparatus for an electric actuator in which a movable member is displaceable when said electric actuator is driven by a rotary driving source, said control apparatus comprising:
   a current-detecting means which detects a current supplied to said rotary driving source;
   a comparing means which compares a detection signal from said current-detecting means with a preset reference current; and
   a current limit means which limits said current supplied to said rotary driving source so that said current does not exceed said reference current when a load is applied to said energized rotary driving source and a drive shaft of said rotary driving source is stopped and locked.

2. The control apparatus according to claim 1, further comprising a direction-switching means which switches a direction of rotation of said rotary driving source to any one of positive and negative directions by switching a polarity of a voltage in accordance with a direction instruction input signal from a controller.

3. The control apparatus according to claim 2, wherein said current limit means is provided in a current amplifier/limiter which converts said voltage outputted from said direction-switching means into a corresponding current.

4. The control apparatus according to claim 3, wherein said current amplifier/limiter includes a storage means which stores said preset reference current.

5. The control apparatus according to claim 1, wherein said detection signal from said current-detecting means is fed back to said comparing means by a current loop.

6. The control apparatus according to claim 1, wherein said electric actuator is controlled by ON/OFF control.

7. The control apparatus according to claim 3, wherein said current-detecting means is disposed between said current amplifier/limiter and said rotary driving source, for detecting the current supplied to said rotary driving source from a location upstream of said rotary driving source.

* * * * *